United States Patent
Washio et al.

(10) Patent No.: US 9,071,549 B2
(45) Date of Patent: Jun. 30, 2015

(54) COMMUNICATION DEVICE USING PLURALITY OF COMMUNICATION PATHS

(75) Inventors: Kazunori Washio, Tokyo (JP);
Masayuki Maruyama, Tokyo (JP);
Hiroyuki Kozuki, Tokyo (JP);
Toshinori Matsui, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 116 days.

(21) Appl. No.: 13/992,921

(22) PCT Filed: Apr. 22, 2011

(86) PCT No.: PCT/JP2011/059943
§ 371 (c)(1),
(2), (4) Date: Jun. 10, 2013

(87) PCT Pub. No.: WO2012/144068
PCT Pub. Date: Oct. 26, 2012

(65) Prior Publication Data
US 2013/0318406 A1 Nov. 28, 2013

(51) Int. Cl.
*G01R 31/28* (2006.01)
*H04L 12/26* (2006.01)
(Continued)

(52) U.S. Cl.
CPC ............. *H04L 43/50* (2013.01); *G08C 25/00* (2013.01); *H04L 1/243* (2013.01); *H04L 1/0061* (2013.01); *H04L 1/08* (2013.01); *H04L 1/22* (2013.01)

(58) Field of Classification Search
CPC ...................................................... H04L 43/50
USPC .................................. 714/715, 712, 748, 724
See application file for complete search history.

(56) References Cited

U.S. PATENT DOCUMENTS 5,414,717 A * 5/1995 Matsumoto et al. ........... 714/748
5,450,439 A * 9/1995 Kato et al. .................... 375/224
(Continued)

FOREIGN PATENT DOCUMENTS

DE 19833292 A1 1/2000
JP 2-166849 A 6/1990
(Continued)

OTHER PUBLICATIONS

Japanese Office Action, issued May 20, 2104, in Patent Application No. 2013-510808.
Communication dated Oct. 10, 2014, from the European Patent Office in counterpart European Application No. 11863907.9.

*Primary Examiner* — Fritz Alphonse
(74) *Attorney, Agent, or Firm* — Sughrue Mion, PLLC; Richard C. Turner (57) ABSTRACT

There are included an opposite-side transmitter unit for transmitting the same messages to plural communication paths, respectively; and a host-side receiver unit for receiving the messages flowing through the plural communication paths, respectively; wherein, the receiver unit, compares the plural received messages to perform verification using error-detection code on any one of the messages when they are identical, or on all of the messages when there is a mismatch; and when detected error of message due to error inclusion or reception failure, discards all of the messages received at that time, and calculates an accumulated number of error detections for each of the communication paths through which the messages has been transmitted, so as to stop receiving the control-related message, when the number of error detections has reached a given number, from the communication path where the number of error detections has reached the given number.

13 Claims, 12 Drawing Sheets

(51) Int. Cl.
  *G08C 25/00* (2006.01)
  *H04L 1/24* (2006.01)
  *H04L 1/00* (2006.01)
  *H04L 1/08* (2006.01)
  *H04L 1/22* (2006.01)

(56) References Cited

U.S. PATENT DOCUMENTS 5,917,831 A * 6/1999 Katker et al. ................. 714/712
2003/0051203 A1 3/2003 Vasko et al.

FOREIGN PATENT DOCUMENTS

| | | |
|---|---|---|
| JP | 3-045097 A | 2/1991 |
| JP | 7-011080 U | 2/1995 |
| JP | 8-037517 A | 2/1996 |
| JP | 9-055776 A | 2/1997 |
| JP | 2005-333345 A | 12/2005 |
| JP | 2007-288570 A | 11/2007 |
| JP | 2010-143458 A | 7/2010 |
| WO | 03023561 A2 | 3/2003 |

* cited by examiner

COMMUNICATION DEVICE USING PLURALITY OF COMMUNICATION PATHS

CROSS REFERENCE TO RELATED APPLICATIONS

This application is a National Stage of International Application No. PCT/JP2011/059943, filed on Apr. 22, 2011, the contents of all of which are incorporated herein by reference in their entirety.

TECHNICAL FIELD

This invention relates to a communication device using a plurality of communication paths for transmitting a message including control-related data, in particular, to a highly safe and reliable communication device.

BACKGROUND ART

Recently, there is increasing demand on electronic devices for higher safety and reliability in communications. For example, in vehicle control systems, there have been studying a system related to a safety of driver such as a brake system and a steering system. In that system, a desired controlling force is calculated by a control device using information as an input which has been digitized by a measuring device from a controlling force of a driver, which is then transmitted by way of signal transmission to a final controlled object, such as a brake mechanism, a motor arranged near a front or rear wheel axle or a hydraulic machine. According to this system, a mechanical system directly connecting the driver to the controlled object is omitted, so that it is possible to save space and to enhance arrangement flexibility of a driver seat and/or driving mechanism. (the system is called as "Steer-by-Wire" etc.)

Similarly, other than communications between electronic devices, there is also demand for higher safety and reliability in communications between control units arranged in a common electronic device. In particular, arising demand therefor is made in communications between control units in an electronic device, such as a control device directed to vehicle running whose failure affects to threaten directly the safety of the driver. In the following, description will be made citing an electric power steering device, as a specific example.

An electric power steering device, one of the vehicle control systems, is a device to assist driver's steering, which achieves assistance by applying an assist force using a motor on a joining section (column shaft, rack and pinion) between a steering wheel and tires. The assist force of the motor is typically calculated by a control unit on the basis of the steering force of the driver detected by a sensor, and is output by controlling a motor driving unit. When signal transmission is used in electric power steering control, a failure in signal transmission leads to an abnormality in the assist force of the motor. In some cases, the abnormality in the assist force of the motor makes influence on drivers steering to finally threaten the safety of the driver.

Figure 16:
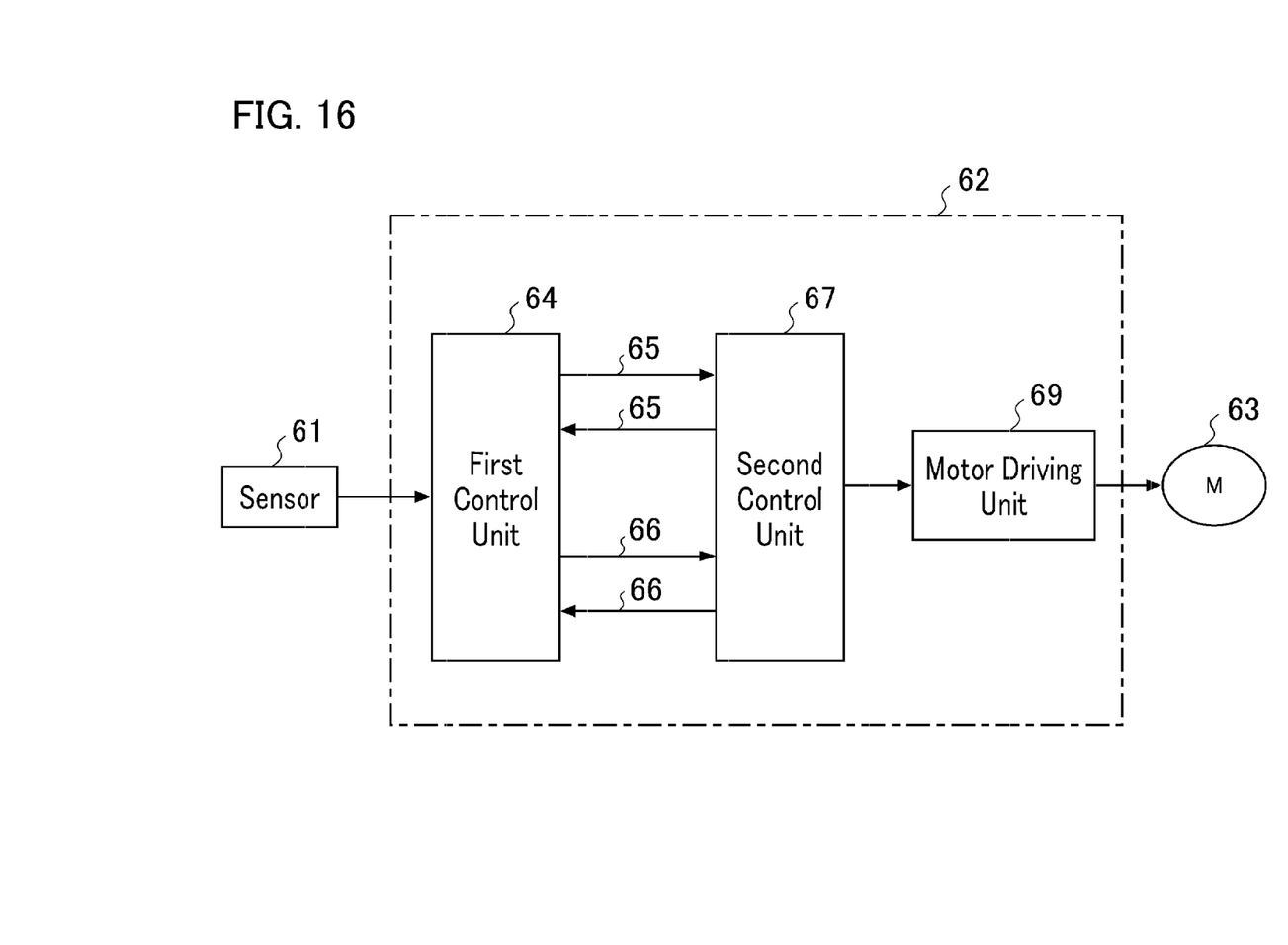
FIG. 16 is a block diagram showing a conventional communication device.

In a conventional electric power steering device, as shown in FIG. 16, reliable communications are made between two different control units (for example, Patent Document 1). Information necessary for the control, such as vehicle information and torque information measured by a sensor 61, is input in a control unit 62, and a current controlled by the control unit 62 in response to the input information is input in the motor 63, so that the electric power steering device is actuated according to a torque output by the motor 53 in response to the current. In the control process of the control unit 62, firstly, a first control unit 64 calculates a motor-current command value using input information from the sensor 61, and transmits the command value to a second control unit 67 by way of a high-speed communication path 65 and a low-speed communication path 66. The second control unit 67 controls a motor driving unit 69 to output a current according to the received motor-current command value. The motor driving unit 69 generates a current under control of the second control unit 67, and outputs it to the motor 63.

In the control process of the control unit 62, the motor-current command value transmitted from the first control unit, 64 to the second control unit 67 finally determines the torque to be output by the motor 63, and thus a higher safety and reliability is required thereto. This is the reason why the communication path is made redundant as the high-speed communication path 65 and the low-speed communication path 66. The way to utilize redundant communication data in the redundant communication paths is that the data communicated through the high-speed communication path 65 is normally utilized, and when an abnormality occurs in the high-speed communication path 65, data switching is made so that the data communicated through the low-speed communication path 66 is utilized. In this way, in the plurality of communication paths, when an abnormality occurs in the high-speed communication path that is utilized for communication in normal time, the path is switched to the low-speed communication path, to thereby continue the control and ensure the reliability.

CITATION LIST

Patent Document

Patent Document 1: Japanese Patent Application Laid-open No. 2010-143458

SUMMARY OF THE INVENTION

Problems to be Solved by the Invention

In such an electric power steering device, in order to realize a communication volume in low-speed communication, it is necessary to remove from a communication volume required for high-speed communication, data other than the motor-current command value necessary for the control. Thus, it is unable to add an error-detection code having a data length comparable to that in the case of high-speed communication, and therefore, the safety is considered not to be ensured. Further, if the data necessary for the control is reduced, a proper responsibility required for the control is not fulfilled, and therefore, the safety is considered not to be ensured.

Meanwhile, as ways to detect an abnormality in the above plurality of communication paths, it is assumed a check sum verification and a comparison verification on the transmitted data by transmitting its inverted data; however, according to a recent demand on safety-related data, a code strength comparable to that of CRC is considered to be necessary. Further, in the case of using any one of the above ways for detecting communication-path abnormality including a CRC code verification, the respective redundant communication data received through the plurality of communication paths are subjected to similar verifications, and thus a processing load of the receiver-side control unit is considered to become higher in proportion to the number of the communication paths.

The invention has been made to solve the problem as described above, and an object thereof is to provide a communication device using a plurality of communication paths which can ensure a safety and reliability by performing verification using an error-detection code, and also suppress a processing load for verification on a message using the error-detection code.

Means for Solving the Problems

A communication device using a plurality of communication paths according to the invention, is a communication device using a plurality of communication paths for transmitting a massage including control-related data, comprising: an opposite-side transmitter unit for transmitting the same messages to the plurality of communication paths, respectively; and a host-side receiver unit for receiving the messages flowing through the plurality of communication paths, respectively; wherein, the receiver unit compares the plurality of received messages with each other, to perform verification using an error-detection code on any one of the messages when they are identical to each other, or on all of the messages when there is a mismatch between them; and then, the receiver unit, when detected an error of the message due to its error inclusion or reception failure, discards all of the messages received at that time, and calculates an accumulated number of error detections for each of the communication paths to which the messages have been transmitted, so as to stop receiving the message related to control, when the number of error detections has reached a given number, from the communication path where the number of error detections has reached the given number.

Effect of the Invention

According to the communication device using a plurality of communication paths according to the invention, with respect to the same plural messages through the plurality of communication paths, it is just enough to perform verification, using an error-detection code imposing a heavy processing load, on any one of the messages identical to each other during the normal time without any fault, so that an increase in processing load is suppressed. Further, when an error of the message is detected by performing verification using the error-detection code, all of the messages received at that time are discarded, and receiving the message related to control is stopped from the communication path where the number of error detections reaches a given number, so that a higher safety is ensured.

The other objects, features, aspects and advantages of the present invention will become more apparent from the following detailed description of the invention with reference to the drawings.

MODES FOR CARRYING OUT TEE INVENTION

Embodiment 1

Figure 1:
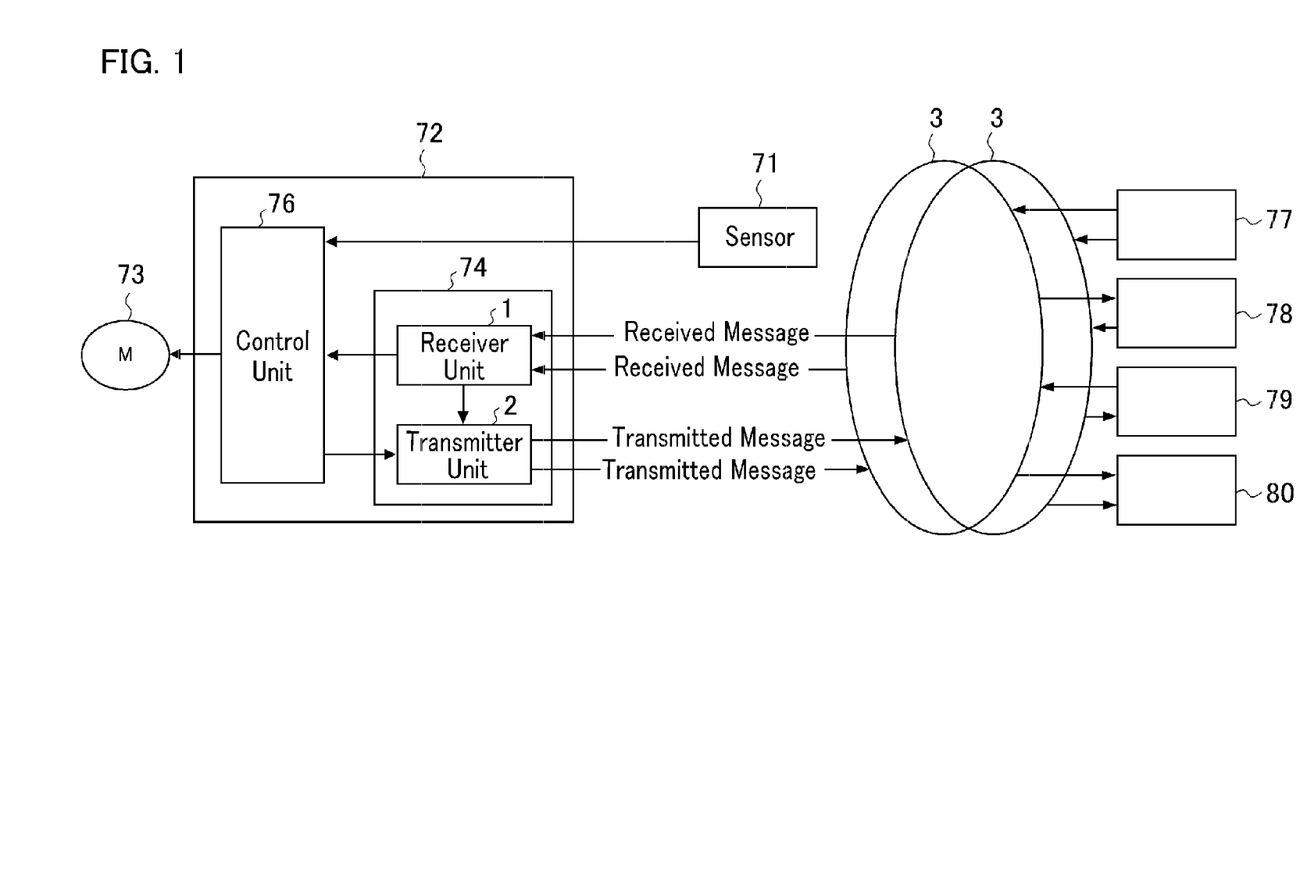
FIG. 1 is a block diagram including a communication device using a plurality of communication paths (hereinafter, simply referred to as "communication device") according to Embodiment 1 of the invention, and showing a motor control unit for producing steering power of an electric power steering device and an in-vehicle network including the communication device.

FIG. 1 is a block diagram including a communication device of Embodiment 1, and showing a motor control unit for producing steering power of an electric power steering device and an in-vehicle network including the communication device. To communication paths 3 including a plurality of communication lines, a plurality of control devices 72 and 77 to 80 each including the communication device are connected, and the respective control, devices transmit/receive a plurality of messages. A motor control unit 72, one of the control devices, calculates a suited steering force on the basis of a plurality of messages coming from a sensor 71 and/or through the in-vehicle network, to thereby control a motor 73 to generate the steering force. The motor control unit 72 includes a control unit 76 and a transmitting and receiving unit 74 of the safety communication device, in which the control unit 76 makes delivery and receipt of data to and from the communication paths 3 through the transmitting and receiving unit 74 of the communication device, to thereby calculate a controlling force on the basis of the data and information from the sensor 71.

The transmitting and receiving unit 74 of the communication device includes a host-side receiver unit 1 and a host-side transmitter unit 2, and inputs reception data that are contained in a plurality of received messages received by the receiver unit 1 into the control unit 76, or transmits to an opposite side, transmission data outputted by the control unit 76 as a plurality of transmission messages through the transmitter unit 2 by way of the in-vehicle network. Here, a master-servant relationship in communication is assumed in which the motor control unit 72 is a slave node and a master node exists in the other control devices 77 to 80 including opposite-side communication devices and connected to the communication paths 3. With the given configuration described above, embodiments for carrying out the communication device of the invention will be described.

Figure 2:
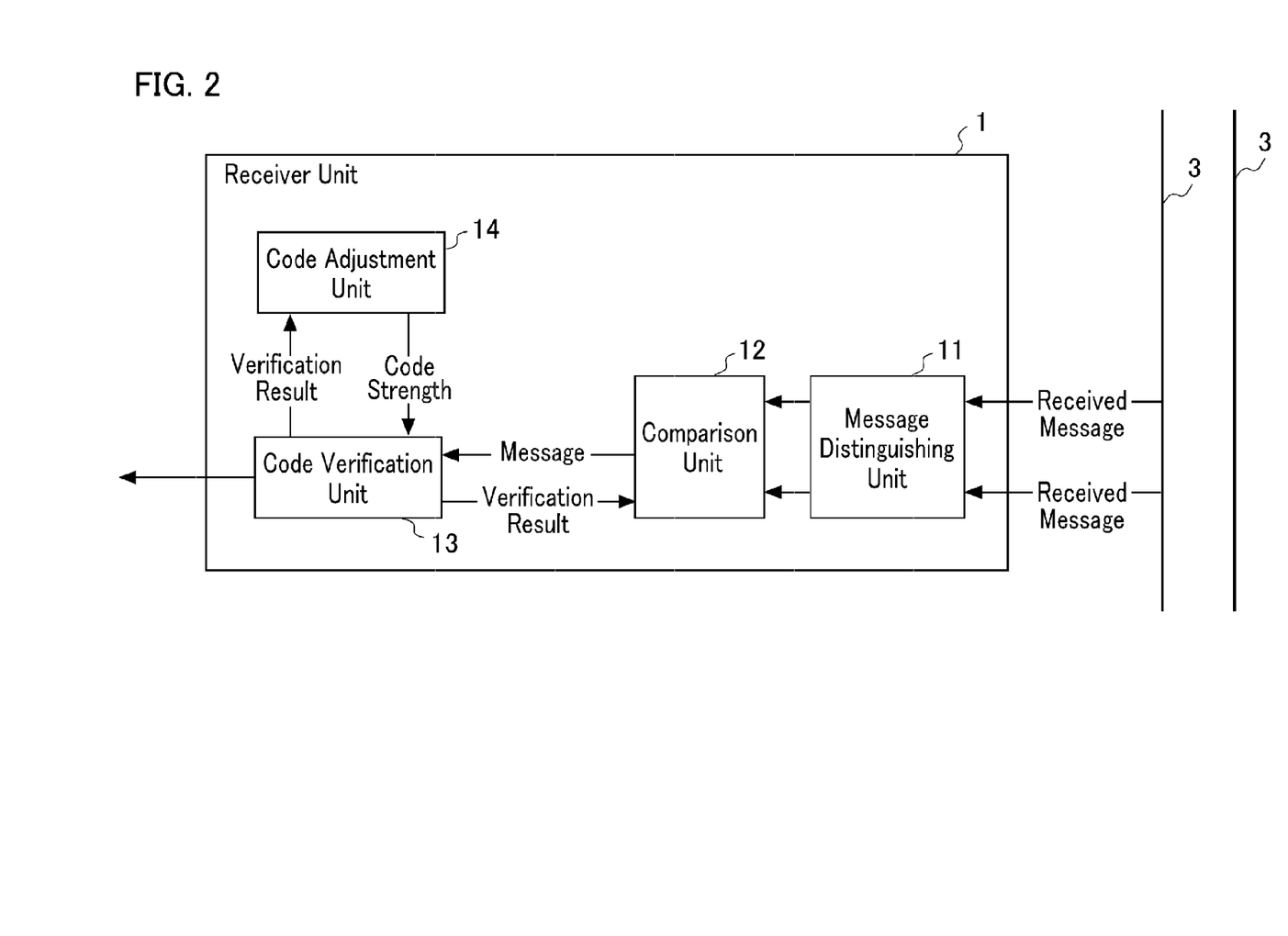
FIG. 2 is a block diagram showing a receiver unit in the communication device of Embodiment 1.
Figure 3:
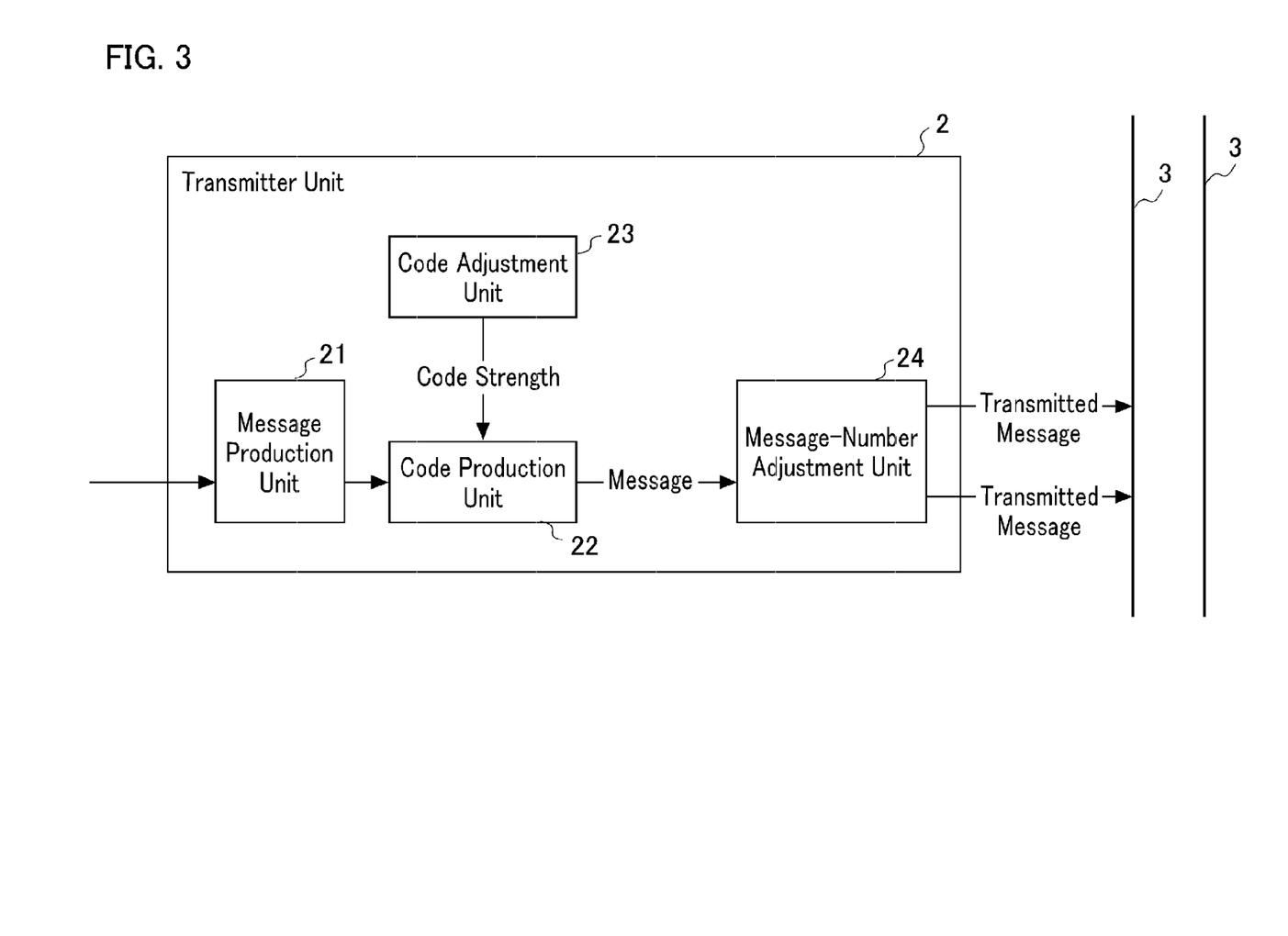
FIG. 3 is a block diagram showing a transmitter unit in the communication device of Embodiment 1.
Figure 4:
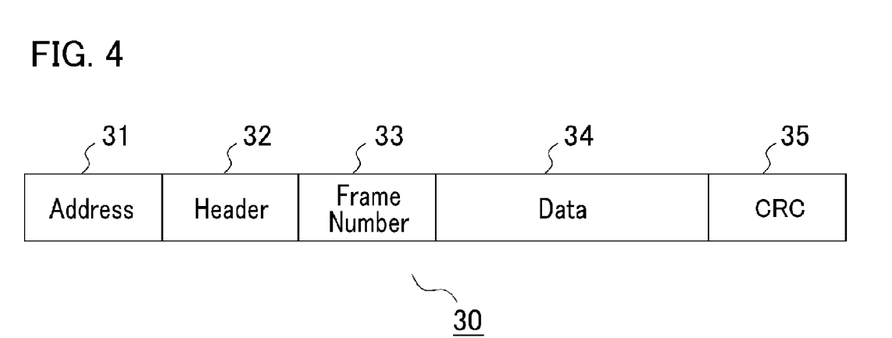
FIG. 4 is diagram showing a frame format of a message used by the communication device of Embodiment 1.

FIG. 2 is a block diagram showing the receiver unit (of the host side or the opposite side) in the communication device of Embodiment 1. FIG. 3 is a block diagram showing the transmitter unit (of the host side or the opposite side) in the communication device of Embodiment 1. There are two kinds of communication devices, one of which is the master node that mainly governs the network and the other of which is the slave node that complies with an instruction of the master node. However, there is a case were a single communication device has both functions of the master node and the slave node. FIG. 4 is diagram showing a frame format of a message transmitted by the communication device of Embodiment 1.

A message 30 includes an address portion 31 containing information of transmission destination or source, a header portion 32 containing a variety of associated information, a frame number portion 33 indicating a serial number of message frames, a data portion 34 containing information such as control data (related to safety) and a portion 35 of Cyclic Redundancy Code (hereinafter, referred to as CRC) which is an error-detection code. Also, there is a case where a second CRC portion (not shown) is further included that verifies only the address and header portions and/or the frame number portion, in the following, an operation of the communication device of Embodiment 1 will be described in detail.

In FIG. 2, the receiver unit 1 of the communication device includes a message distinguishing unit 11, a comparison unit 12, a code verification unit 13 and a code adjustment unit 14. The message distinguishing unit 11 receives from the plurality of communication paths 3 (here, two paths), a plurality of reception messages with a frame format as stated in the message 30, to determine each type of the message. The types of reception messages includes a control message related to a (safety) control, a test message for evaluating the communication path as well as the communication status, and a change-request message which is a request from the opposite side of communication for Changing communication mode. The type of the message is indicated in the header 32 of each message. Namely, the message distinguishing unit 11 receives the respective reception messages from the two communication paths 3 and determines their respective types, based on the header 32. In the following, a receiving process related to a control message will be illustrated.

Figure 5:
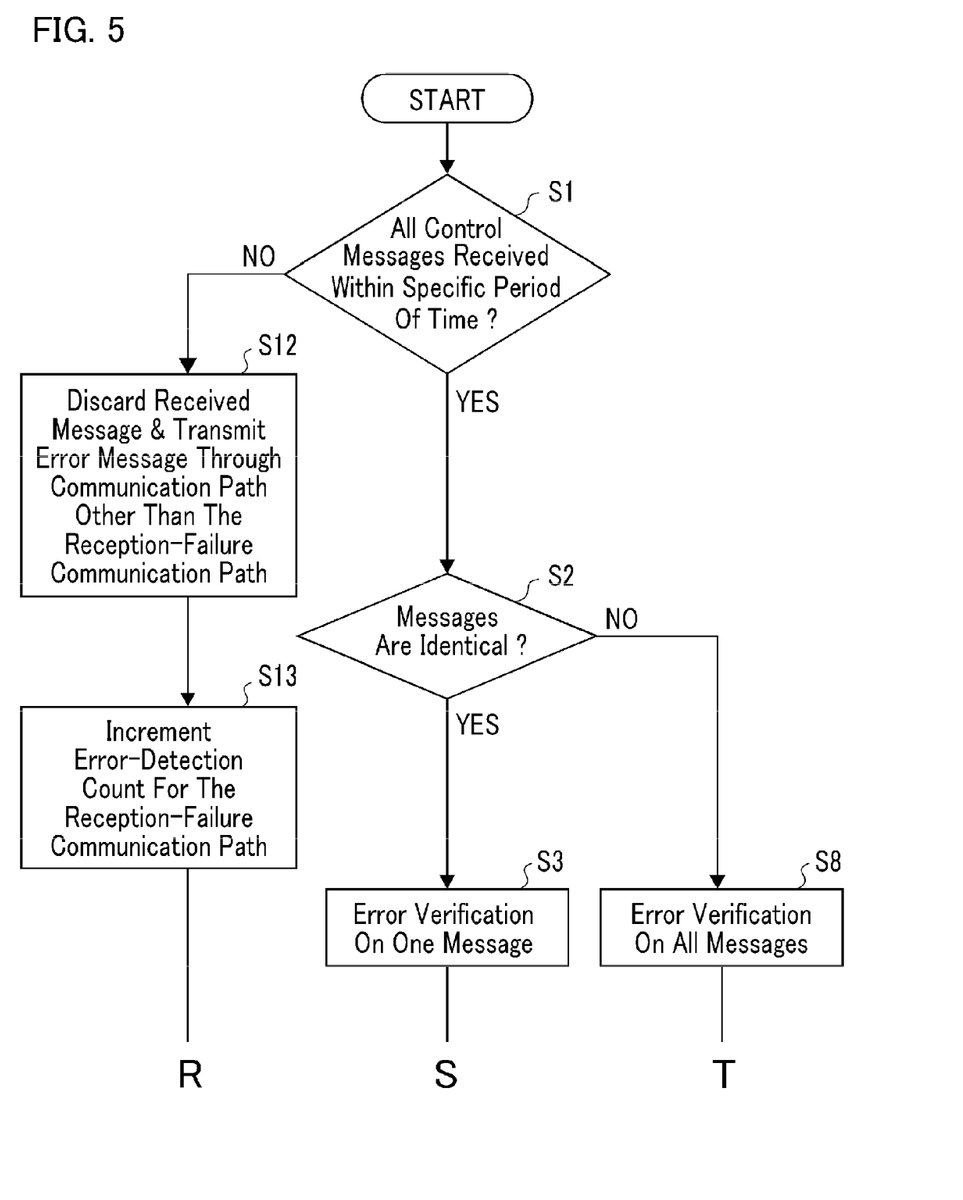
FIG. 5 is a first part of flowchart showing a receiving process of a control message at the receiver unit of the communication device of Embodiment 1.
Figure 6:
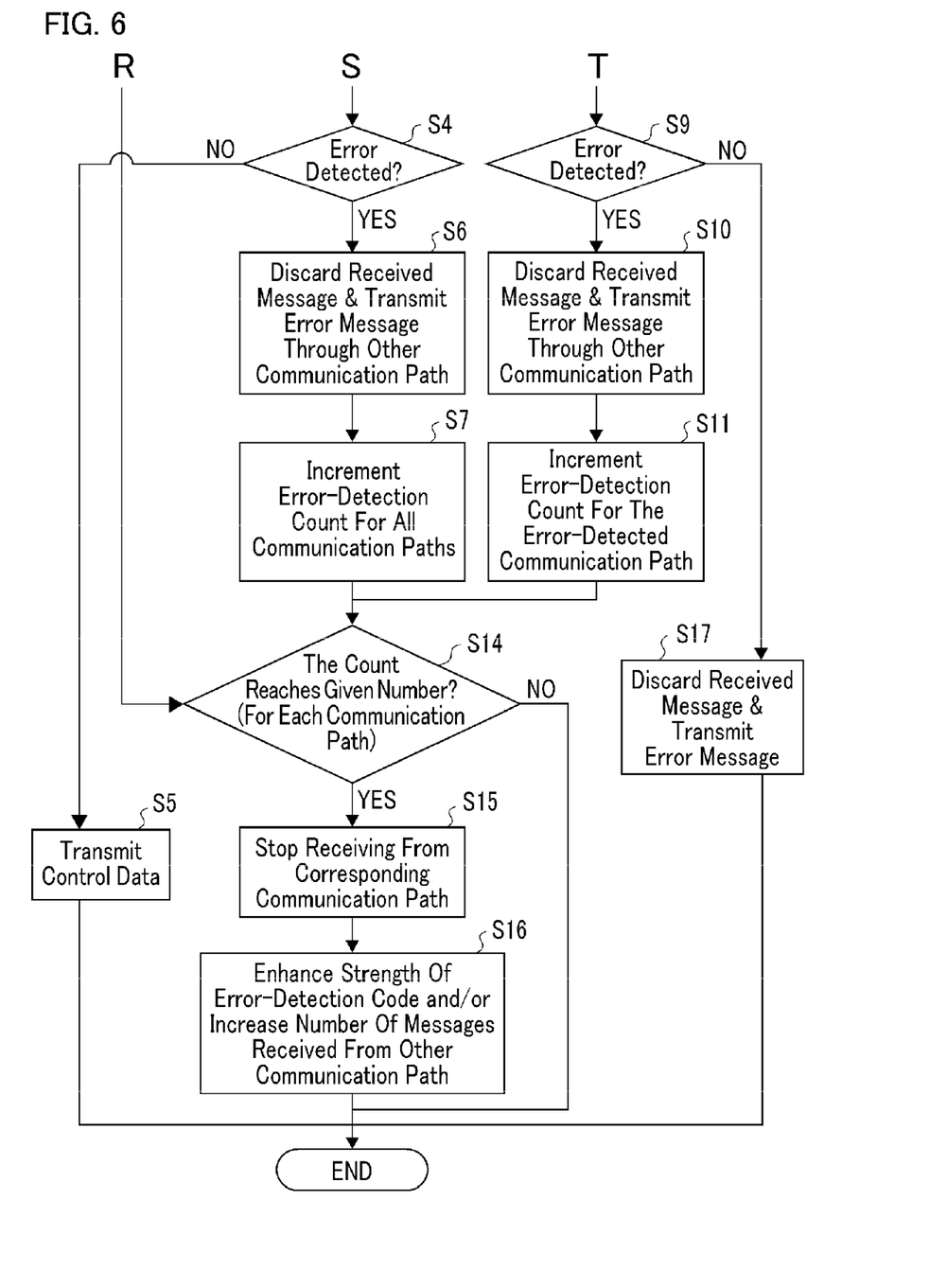
FIG. 6 is a last part of flowchart showing a receiving process of a control message at the receiver unit of the communication device of Embodiment 1, its combination with FIG. 5 showing a single flowchart.

FIG. 5 and FIG. 6 represent in combination a flowchart showing a receiving process of a control message at the receiver unit (on a host side) of the communication device of Embodiment 1. The indications R, S and T in FIG. 5 are connected to the indications R, S and T in FIG. 6, respectively. When the reception message is a control message, a predetermined number of or a specified number of the reception messages are to be received from the respective communication paths 3, said specified number being stated in the content of a change-request message to be described later. For example, let's assume that the respective same control messages are to be received individually through the two communication paths 3 from the opposite-side transmitter unit. When all of the control messages are received within a specific period of time (Step S1 "YES"), the messages received are sent to the comparison unit 12. In the comparison unit 12, two messages are compared to each other (Step S2). If the two messages are identical to each other, one of the messages is sent to the code verification unit 13 where an error verification is made on the message 30 (Step S3). If not identical, the all messages are sent to the code verification unit 13 where error verifications are made on the messages (Step S8).

The code verification unit 13 performs verification using an error-detection code (for example, CRC) on the message received from the comparison unit 12. As the CRC used for verification, a generated polynomial equation is applied which has been preset by the code adjustment unit 14 for each of the reception messages. If the result of comparison is "identical" and the result of CRC verification shows "no error" (Step S4, "NO"), the control-related data is taken out from the control message and sent to the control unit 76 illustrated in FIG. 1 (Step S5). If an error is found by the CRC verification (Step S4, "YES" and Step S9, "YES"), or if the result of comparison is "non-identical" and "no error" is found by the CRC verification (Step S9, "NO"), error detection is notified to the comparison unit 12, the code adjustment unit 14 and the control unit 76.

Upon receiving the error-detection notification from the code verification unit 13, the comparison unit 12 discards the messages having been received and transmits to the communication opposite side through the host-side transmitter unit 2 in the communication device, an error message including information of occurrence of communication abnormality and information about the abnormal communication path 3, using a proper communication path 3 (Step S6, Step S10 and Step S17). In the case of Step S17, since the abnormal communication path is unknown, the error message is transmitted through either one of the communication paths 3. In this transmission, although the abnormal communication path 3 may be used, care should be taken for lack of the credibility. At that time, the control unit 76 having a part of the function of the receiver unit 1 records the number of error detections for each of the communication paths 3 through which the error-detected message has been transmitted (Step S7 and Step S11), and, when the number of error detections reaches a given number (a threshold value) (Step S14, "YES"), stops receiving the control message from the corresponding communication path 3 (Step S15). That is, even if a control message has been transmitted through said communication path 3, the control message is discarded.

In addition, the comparison unit 12 instructs the code adjustment unit 14 to enhance the code strength (Step S16). Upon receiving the instruction, the code adjustment unit 14 changes the CRC code having been preset to each message, to that having a higher code strength than the current one. For example, in the case of currently using a CRC-8 (8 bits), it is changed to a CRC-16 (16 bits). Instead, it is changed to a CRC of a generated polynomial equation having a longer hamming distance, although with the same code length. Alternatively, a number of control messages to be received from the proper communication path 3 is increased (Step S16). In this case, the number of the control messages received from the proper communication path 3 is changed to two. Namely, the same two control messages are serially received from the proper communication path 3.

Meanwhile, if reception of the control messages has not completed in a specific period of time (Step S1, "NO"), the comparison unit 12 discards any received message, and transmits to the communication opposite side through the host-side transmitter unit 2, an error message including information of occurrence of transmission abnormality and information about the abnormal communication path 3, using a proper communication path 3 (Step S12). Further, the number of error detections due to reception failure of the message is recorded for each communication path (Step S13), and when the number of error detections due to reception failure reaches a given number (a threshold value), a similar process is performed to that previously described for the case where the number of error detections reaches a given number. Instead, when a sum of the number of error detections due to reception failure and the number of error detections from the code verification unit 13 reaches a given number, a similar process is performed to that previously described for the case where the number of error detections reaches a given number (Step S14 or Step S16).

On the other hand, the host-side or opposite-side transmitter unit 2 of the communication device comprises a message production unit 21, a code production unit 22, a code adjustment unit 23 and a message-number adjustment unit 24. Examples of the messages to be transmitted include, as described for the receiver unit 1, a control message related to a control, a test message for evaluating the communication path as well as the communication status, and a change-request message which is a request from the communication opposite side for changing communication mode. In the following, an operation of the transmitter unit 2 will be described in detail.

Figure 11:
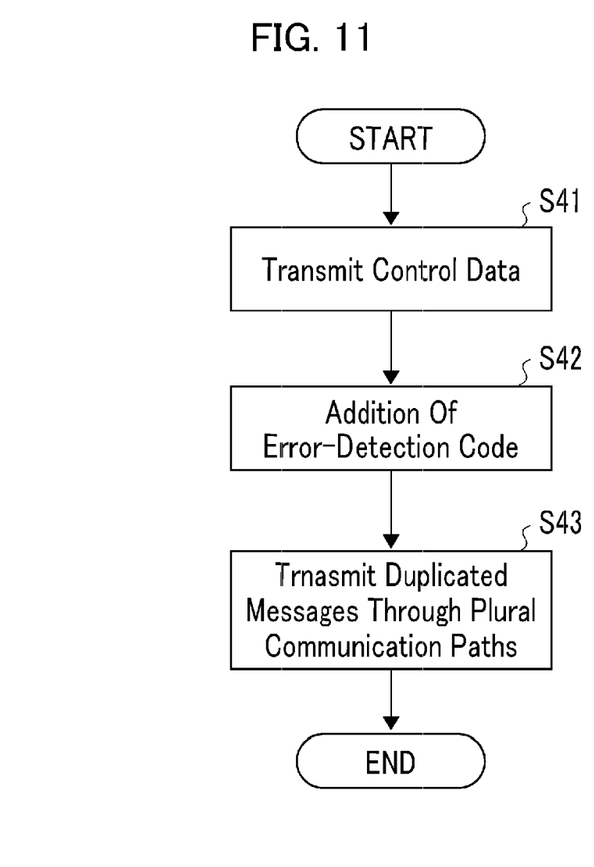
FIG. 11 is a flowchart showing a transmitting process of a control message at a transmitter unit in the communication device of Embodiment 1.
Figure 12:
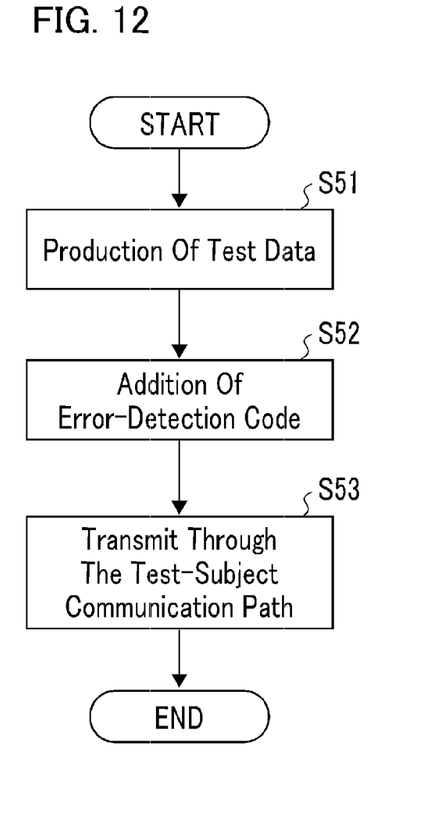
FIG. 12 is a flowchart showing a transmitting process of a test message at a transmitter unit on a master node in the communication device of Embodiment 1.
Figure 13:
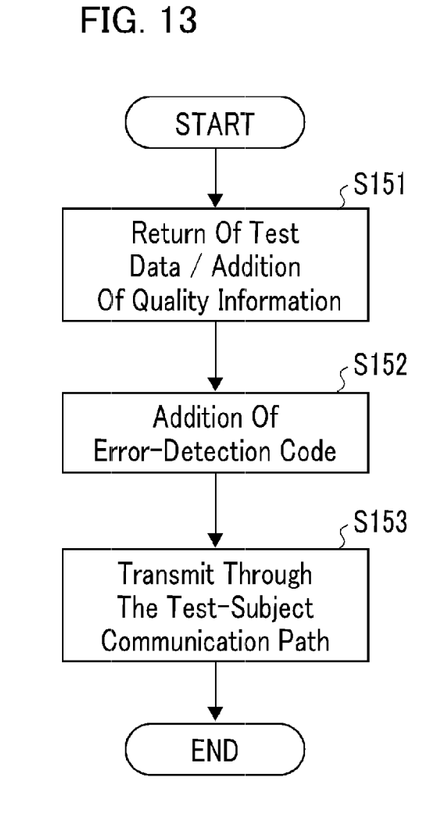
FIG. 13 is a flowchart showing a transmitting process of a test message at a transmitter unit on a slave node in the communication device of Embodiment 1.
Figure 14:
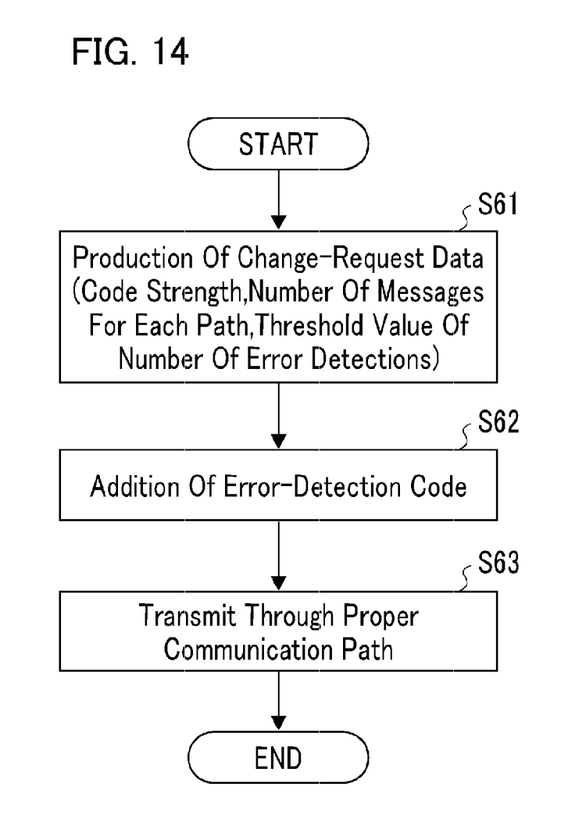
FIG. 14 is a flowchart showing a transmitting process of a change-request message at a transmitter unit in the communication device of Embodiment 1.
Figure 15:
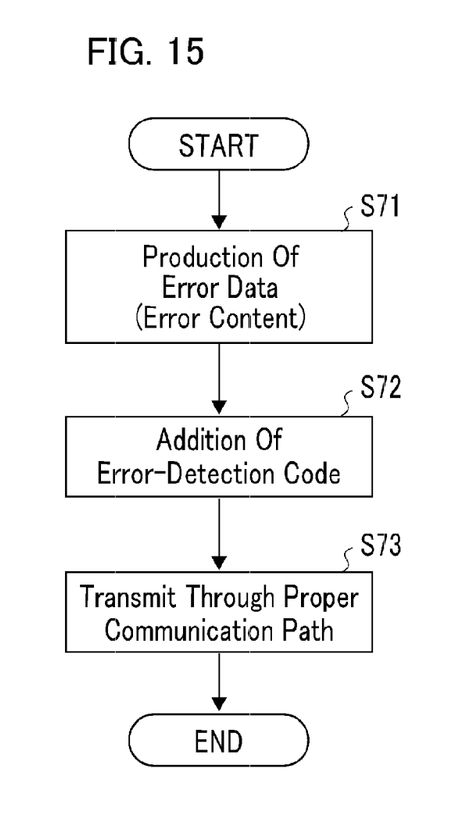
FIG. 15 is a flowchart showing a transmitting process of an error message at a transmitter unit in the communication device of Embodiment 1.

FIG. 11 is a flowchart showing a transmitting process of a control message at the host-side transmitter unit in the communication device of Embodiment 1. FIG. 12 is a flowchart showing a transmitting process of a test message at the host-side transmitter unit on a master node. FIG. 13 is a flowchart showing a transmitting process of a test message at the host-side transmitter unit on a slave node. FIG. 14 is a flowchart showing a transmitting process of a change-request message at the host-side transmitter unit. FIG. 15 is a flowchart showing a transmitting process of an error message at the host-side transmitter unit.

FIG. 11 to FIG. 15 show process flows of the transmitter unit for the respective messages, which will be described collaterally. In the message production unit 21, a control message is produced based on data sent from the control unit 76 (FIG. 11, Step S41). In the message production unit 21, a test message for evaluating the communication path and a returned test message additionally including quality information (FIG. 12, FIG. 13, Step S51, Step S151). In the message production unit 21, a change-request message for the communication opposite side to change a code strength, a number of messages for each communication path and/or a threshold value of the number of error detections, is produced (FIG. 14, Step S61). Or, in the message production unit 21, an error message for transmitting detail of an error is produced (FIG. 15, Step S71). The types of these messages 30 are each stored in the header 32 of the message.

The message produced by the message production unit 21 is sent to the code production unit 22. The code production unit 22 adds an error-detection code (for example, CRC) to each message (FIG. 11, FIG. 12, FIG. 13, FIG. 14, FIG. 15, Step S42, Step S52, Step S152, Step S62, Step S72). In that case, the error-detection code to be added is calculated using a generated polynomial equation which has been specified by the code adjustment unit 23 for each message. The CRC-added message is sent to the message-number adjustment unit 24. The message-number adjustment unit 24 transmits the same transmission messages to the plurality of communication paths 3, according to the qualities of the communication paths 3 (FIG. 11, Step S43). For example, the same messages are individually transmitted to two communication paths 3.

Meanwhile, depending on the type of message, a plurality of different messages may be transmitted to their respectively assigned communication paths 3. For example, one message is transmitted to a given communication path 3 whereas two messages different to said one message are transmitted to another communication path 3.

In that case, what kind of error-detection code is used, which communication path 3 is utilized, and how many number of messages is applied, for transmitting the control messages, may be predetermined in agreement with the communication opposite side, or may be informed using a change-request message before the transmission. When the type of message is a test message, the test message is transmitted through the test-subject communication path (FIG. 12, FIG. 13, Step S53, Step S153). When it is a change-request message or an error message, the change-request message or the error message is transmitted through a proper communication path (FIG. 14, FIG. 15, Step S63, Step S73).

Here, when the host-side receiver unit 1 receives an error message indicating a transmission abnormality from the opposite-side transmitter unit, the receiver unit specifies from the error message the communication path 3 where the transmission abnormality occurred, and instructs the host-side transmitter unit 2 not to assign the abnormal communication path 3 for transmission. At that time, the host-side transmitter unit determines qualities of the plurality of communication paths on the basis of the error message. Further, the host-side receiver unit 1 instructs the code adjustment unit 14 to enhance the code strength. Upon receiving said instruction, the code adjustment unit 14 changes the CRC code having been preset to each message, to that having a higher code strength than the current one. For example, in the case of currently using a CRC-8 (8 bits), it is changed to a CRC-16 (16 bits). Instead, it is changed to a CRC of a generated polynomial equation having a longer hamming distance, although with the same code length. Alternatively, the host-side receiver unit instructs the host-side transmitter unit 2 to increase a number of control messages to be transmitted to the proper communication path 3. In that case, the number of the control messages transmitted to the proper communication path 3 is changed to two. Namely, the same two control messages are serially transmitted to the proper communication path 3.

The master node produces a change-request message representing the changing content(s) as described above, and transmits it to the slave node. Upon receiving the change-request message, the slave node changes its receiving mode according to the content(s) of the change-request message. In a situation where some of the communication paths 3 are not properly usable due to their transmission abnormalities, the master node transmits a test message for evaluating the communication path 3 to the slave node utilizing the communication path 3 in abnormal state.

Figure 7:
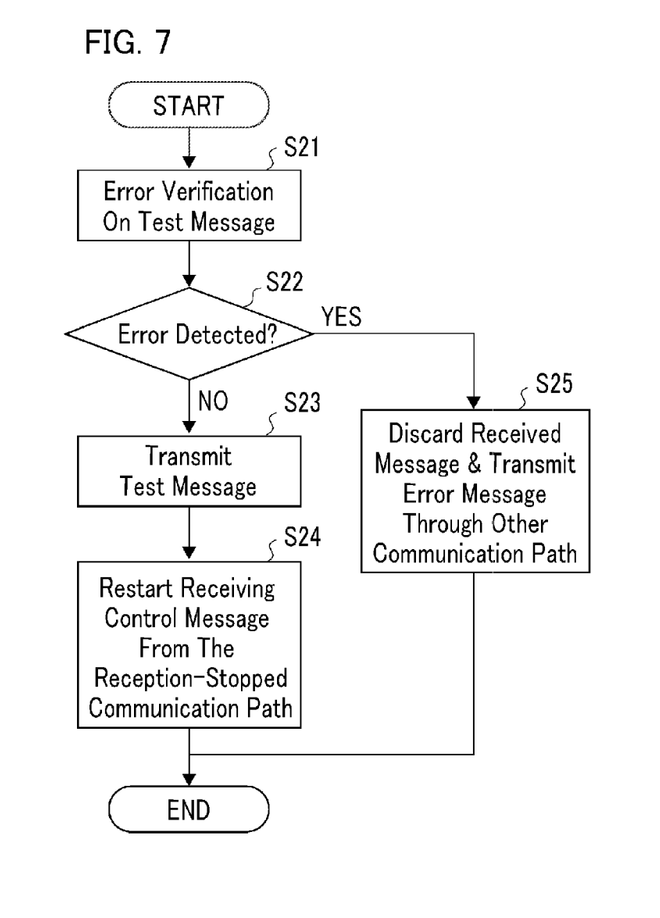
FIG. 7 is a flowchart showing a receiving process of a test message at a receiver unit on a slave node in the communication device of Embodiment 1.

FIG. 7 is a flowchart showing a receiving process of the test message at a receiver unit on the slave node. The test message contains test data for an evaluation test. The slave node that identified and received the test message from the communication path in abnormal state, performs verification using the error-detection code (Step S21), and, if no error is detected (Step S22, "NO"), returns to the master node (Step S23) a test message containing test data having been contained in the received test message without change or with quality information about the communication path 3 added to the test data (Step S23). Further, the slave node transmits a test message for evaluating the communication path to the master node. Furthermore, the slave node restarts receiving the control message from the communication path 3 from which the reception has been stopped (Step S24). If detected an error in the test message (Step S22, "YES"), the slave node discards the received message, and transmits an error message to the master node through the other communication path 3 (Step S25).

Meanwhile, it is preferable that the transmitter unit, which constitutes the master node, adjust a number or code strength of the messages to be transmitted to each of the plurality communication paths according to qualities of the communication paths. It is also preferable that the transmitter unit transmit an outward test message to each of the plurality of communication paths, and thereafter, inspect each returned test message replied from the communication opposite side, to thereby determine each quality of the plurality of communication paths. In the returned test message, communication-path quality information may be contained which is being held by the communication opposite side that received the outward test message.

Figure 8:
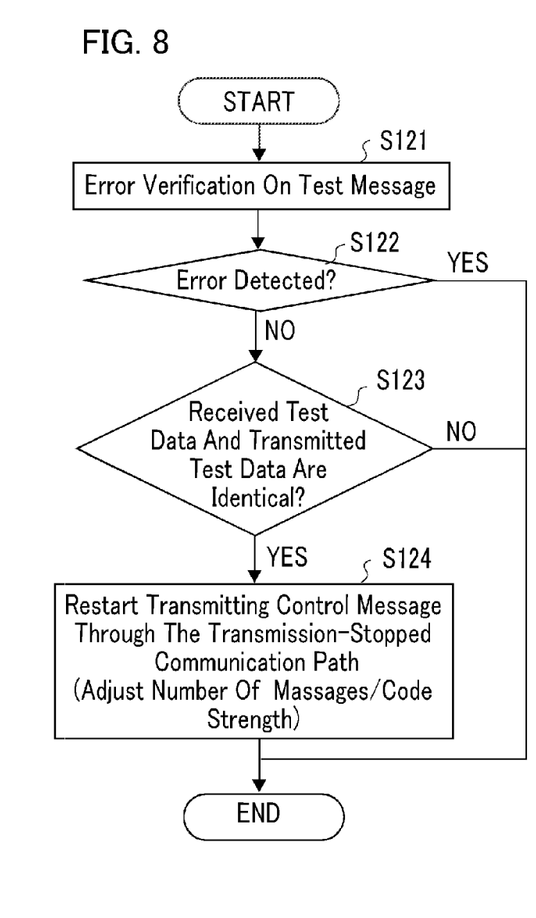
FIG. 8 is a flowchart showing a receiving process of a test message at a receiver unit on a master node in the communication device of Embodiment 1.

FIG. 8 is a flowchart showing a receiving process of the test message at a receiver unit on the master node. Upon receiving the returned test message, the master node performs verification using an error detection code (Step S121), and, if no error is detected (Step S122, "NO"), compares the test data contained in the received test message with the test data that the master node itself has transmitted, to determine whether they are identical to each other. If they are identical (Step S123, "YES"), it is judged that the communication path 3 has returned to the proper state. If not identical (Step S122, "YES"; Step S123, "NO"), it is judged that the communication path 3 is still in an abnormal state.

When the communication path 3 has returned to the proper state, the master node restarts transmitting the control message by use of said communication path 3 (Step S124). At that time, when the code strength has been enhanced, it is changed to return to the original strength, and the same control messages are transmitted using the two communication paths 3. On the other hand, when the number of control messages for the other communication path 3 has been increased, the number of control messages for said other communication path 3 is decreased, and the control message transmitted using instead the communication path 3 that has returned to the proper state. In these cases, the master node transmits a change-request message for changing the communication mode to the slave node. Also, the master node can specify in the change-request message, a threshold value of number of error-detections or number of reception-failure error-detections for the slave node. The master node produces a change-request message indicating such changing content (s), and transmits it to the slave node.

Figure 9:
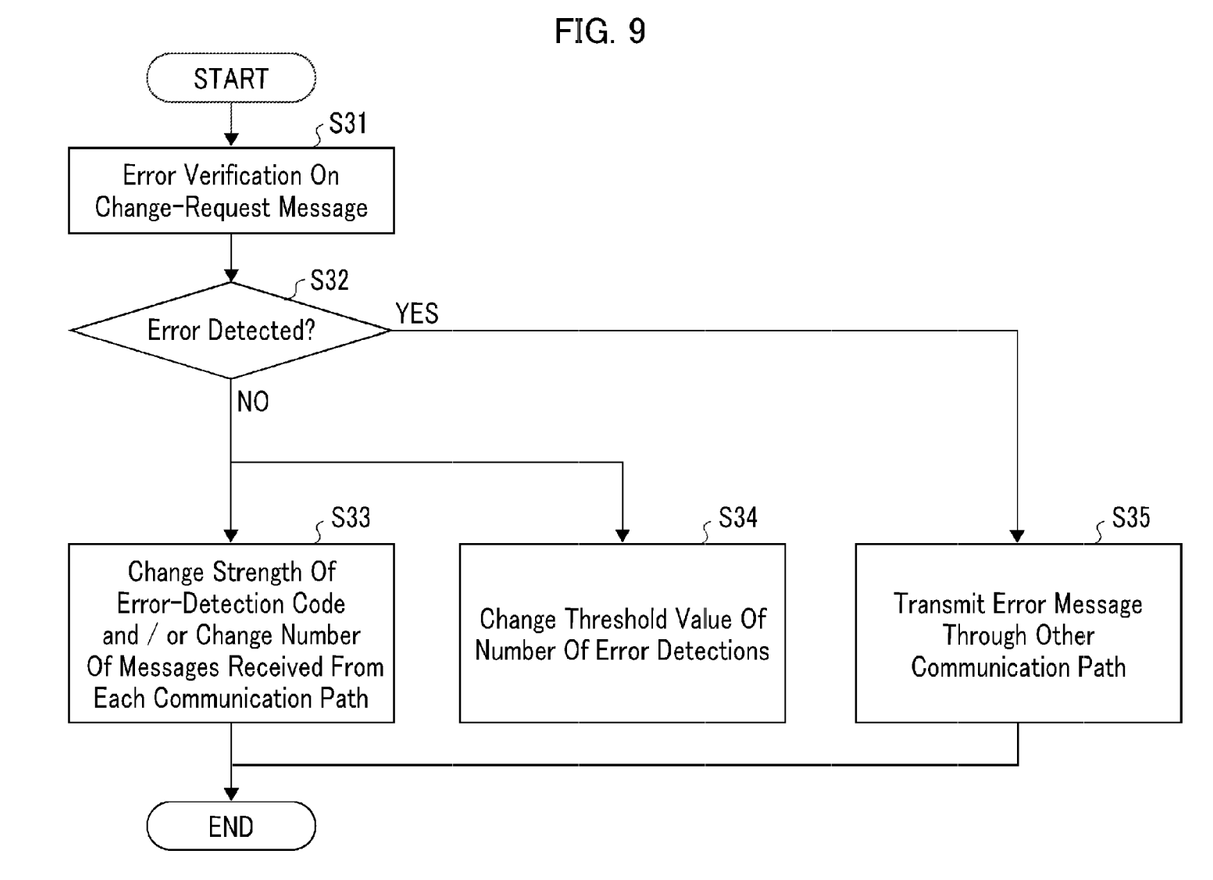
FIG. 9 is a flowchart showing a receiving process of a change-request message at a receiver unit on a slave node in the communication device of Embodiment 1.

FIG. 9 is a flowchart showing a receiving process of the change-request message at a receiver unit on the slave node. Upon receiving the change-request message, the slave node performs verification on the change-request message (Step S31). If no error is found (Step S32, "NO"), with respect to the reception mode, the slave node changes the strength of error-detection code and/or the number of messages to be received through each of the communication paths (Step S33), or changes the threshold value of number of error-detections or number of reception-failure error-detections (Step S34), according to the content(s) in the change-request message. If an error is detected (Step S32, "YES"), the slave node transmits an error message through the proper communication path 3 (Step S35). To the change-request message or the test message, a predetermined CRC is added, or a CRC having a strength of error-detection code according to the change request or the test content is added. Meanwhile, the change-request message or the test message may be transmitted in a plural number as the same messages.

Figure 10:
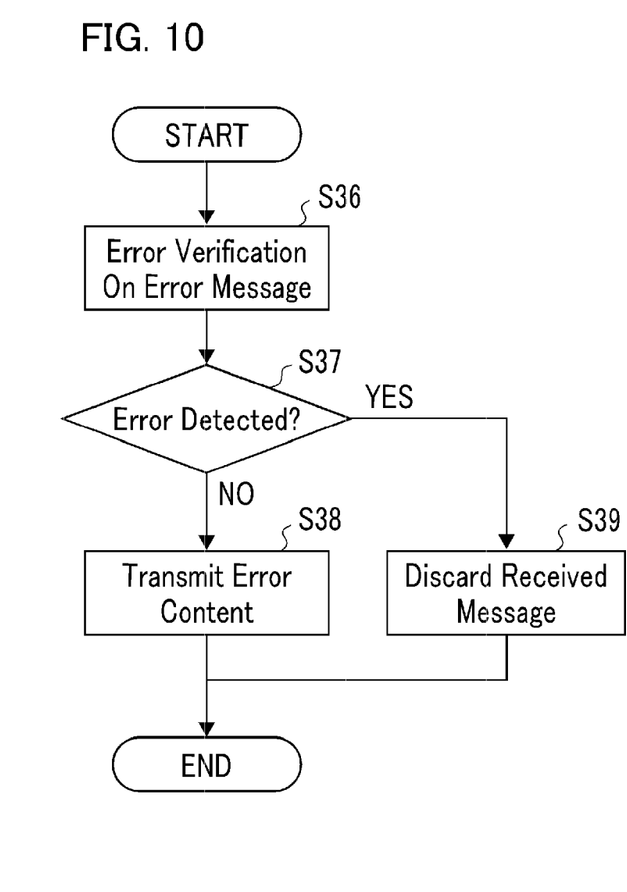
FIG. 10 is a flowchart showing a receiving process of an error message at a receiver unit in the communication device of Embodiment 1.

FIG. 10 is a flowchart showing a receiving process of the error message at a receiver unit. Upon receiving the error message, the receiver unit performs error-verification on the error message (Step S36). If no error is found (Step S37, "NO"), the content in the error message is transmitted to the control unit 76, etc. (Step S38). If an error is detected (Step S37, "YES"), the received error message is discarded (step S39).

With the configuration described above, the communication device according to the invention can ensure both safety and reliability, even if, among the plurality of communication paths, one or plural communication paths become(s) abnormal; and, for the same plural redundant messages through the plurality of communication paths, it is just enough to perform verification, using an error-detection code generally imposing a heavy processing load, on any one of the messages identical to each other during the normal time when the same messages are identical even after their transmission, so that an increase in processing load is suppressed. Further, in addition to the above effect, due to the combination of the matching test between the messages and the verification using error-detection code, it is possible to enhance safety of the data to be received. Also, it is possible, when the received messages include errors, to specify the communication path with a higher error-rate of received message, so that a transmission abnormality is surely notified to the other communication device. Further, the transmitting side of the test message can evaluate the communication path to which it transmitted the message, and the receiver unit on the transmitting side can evaluate the communication path used for the test message.

Further, when abnormality in communication path is resolved, it is possible to automatically restore the communication mode from the degenerated state, so that the communication mode is restored from the degenerated state in synchronization with the transmitting side. Further, since the system can specify the number of error detections, it is possible to flexibly change a time-out period of time for a case of transmission abnormality. Furthermore, it is possible to ensure reliability, safety and transmission volume (transmission speed) in conformity with the states of the plurality of communication paths, and to adjust, by using an error message, the communication mode to an optimum one according to a quality of each communication path.

Further, since the communication mode can be adjusted by using a test message to an optimum one according to a quality of each communication path, accuracy of quality information about the communication path by the test message can be enhanced. In addition, synchronization in communication mode is achieved by notifying in advance the transmission-destination side of a change in communication mode.

In Embodiment 1, when the plurality of messages containing control-related data are to be transmitted, the contents of the messages are explained as identical to each other; however, data portion(s) of half of the messages may be inverted to be transmitted, so that, at the receiver side, the data portion(s) is reversed to be restored which is then compared with the data portion(s) of the other message(s). This makes it possible to detect much more errors. Further, the same effect can of course be achieved when parity bits, a BCH code, a Reed-Solomon code, an error-correction code or the like is used as an error-detection code to be added to the message, other than a CRC code.

Various modifications and alternations of this invention will be achievable to those skilled persons in the art without departing from the scope and spirit of the invention, and it should be understood that the invention is not limited to the respective embodiments set forth in the specification.

The invention claimed is:

1. A communication device using communication paths, the communication device comprising:
   an opposite-side transmitter unit configured to transmit messages to the communication paths, respectively; and
   a host-side receiver unit configured to receive the messages flowing through the communication paths, respectively;
   wherein, the host-side receiver unit is configured to compare the received messages with each other to generate a comparison result, perform verification using an error-detection code on any one of the messages when the comparison result indicates that the messages are identical to each other, or perform the verification on all of the messages when the comparison result indicates that there is a mismatch between the messages; and
   in response to the host-side receiver unit detecting, based on the verification, an error of one of the messages due to the one message including error or reception failure, the host-side receiver unit is configured to discard all of the messages received when the one message is received, calculate an accumulated number of error detections for each of the communication paths through which the messages have been transmitted, and stop receiving messages related to control which are transmitted through one of the communication paths having the accumulated number of error detections which reaches a given number.

2. The communication device using communication paths of claim 1, wherein, when the host-side receiver unit stops receiving the messages related to control from the communication path having the accumulated number of error detections which has reached the given number, the host-side receiver unit is configured to enhance a code strength of the error-detection code for messages to be received from a proper one of the communication paths.

3. The communication device using communication paths of claim 1, wherein, when the host-side receiver unit stops receiving the messages related to control from the communication path having the accumulated number of error detections which has reached the given number, the receiver unit is configured to increase a number of messages to be received from a proper one of the communication paths.

4. The communication device using communication paths of claim 1, further comprising, a host-side transmitter unit and an opposite-side receiver unit, wherein, when the host-side receiver unit detects the error of the one message, the host-side transmitter unit is configured to transmit an error message to the opposite-side receiver unit using a communication path other than the communication path through which the message having the detected error has been transmitted.

5. The communication device using communication paths of claim 1, wherein the host-side receiver unit is configured to distinguish a test message among the received messages, and the host-side transmitter unit is configured to transmit a verification result on the test message and another test message for evaluating one of the communication paths.

6. The communication device using communication paths of claim 5, wherein, if no error is indicated by the verification result on the test message input from a reception-stopped communication path, the host-side receiver unit is configured to restart receiving the one message from the reception-stopped communication path.

7. The communication device using communication paths of claim 1, wherein the host-side receiver unit is configured to receive a change-request message specifying a number of messages to be received or a code strength, and change a receiving mode on the basis of the change-request message.

8. The communication device using communication paths of claim 1, wherein the host-side receiver unit is configured to receive a change-request message specifying a number of error detections for the host-side receiver unit to stop receiving the messages related to control, and stop receiving the messages related to control from the communication path where an error number has reached said number of error detections.

9. The communication device using communication paths of claim 1, wherein, for comparing the received messages with each other, the host-side receiver unit is configured to receive the messages including an inverted message whose data portion has been inverted from a data portion of a specific message, reverse the inverted data portion of the specific message to restore the specific message, and compare the restored specific message with another of the received messages.

10. The communication device using communication paths of claim 1, wherein the opposite-side transmitter unit is configured to adjust a number or code strength of messages to be transmitted to each of the communication paths according to a quality of each of the communication paths.

11. The communication device using communication paths of claim 10, further comprising an opposite-side receiver unit and a host-side transmitter unit, wherein, the opposite-side receiver unit is configured to receive an error message indicating occurrence of error from the host-side transmitter unit, and the opposite-side transmitter unit is configured to determine the quality of each of the plurality of communication paths on the basis of said error message.

12. The communication device using communication paths of claim 10, further comprising a host-side transmitter unit, wherein the opposite-side transmitter unit is configured to transmit an outward test message to the plurality of communication paths, and inspect each returned test message received from the host-side transmitter unit to determine the quality of each of the plurality of communication paths.

13. The communication device using communication paths of claim 12, wherein the returned test message contains quality information of the communication path held in the host-side transmitter unit that received the outward test message.

* * * * *